United States Patent
Dandoko

(10) Patent No.: US 11,372,520 B2
(45) Date of Patent: Jun. 28, 2022

(54) DISPLAY INPUT APPARATUS AND IMAGE FORMING APPARATUS CAPABLE OF MOVING PLURALITY OF ICONS FROM ONE PAGE TO ANOTHER ON DISPLAY DEVICE AND DISPLAYING MOVED ICONS THEREON

(71) Applicant: KYOCERA Document Solutions Inc., Osaka (JP)

(72) Inventor: Takushi Dandoko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/214,515

(22) Filed: Mar. 26, 2021

(65) Prior Publication Data

US 2021/0311609 A1 Oct. 7, 2021

(30) Foreign Application Priority Data

Apr. 6, 2020 (JP) .............................. JP2020-068502
Mar. 1, 2021 (JP) .............................. JP2021-031958

(51) Int. Cl.
*G06F 3/04817* (2022.01)
*G06F 3/0483* (2013.01)
(Continued)

(52) U.S. Cl.
CPC ........ *G06F 3/04817* (2013.01); *G06F 3/0483* (2013.01); *G06F 3/0486* (2013.01); *H04N 1/00392* (2013.01); *H04N 2201/0082* (2013.01)

(58) Field of Classification Search
CPC ............... G06F 3/0486; G06F 3/04842; G06F 3/04817; G06F 3/0483; G06F 3/0482;
(Continued)

(56) References Cited

U.S. PATENT DOCUMENTS

2012/0084692 A1\* 4/2012 Bae ....................... G06F 3/0483
715/769
2012/0304084 A1\* 11/2012 Kim ...................... G06F 3/0486
715/762

(Continued)

FOREIGN PATENT DOCUMENTS

JP 2017-188139 A 10/2017

OTHER PUBLICATIONS

Thomas, Dallas. 'Move Multiple Home Screen Apps at Once'. In Gadget Hacks [online]. Oct. 29, 2019 [retrieved on Nov. 18, 2021]. Retrieved from the Internet: https://ios.gadgethacks.com/how-to/move-multiple-home-screen-apps-once-0177985/ (Year: 2019).\*

*Primary Examiner* — David S Posigian
(74) *Attorney, Agent, or Firm* — IP Business Solutions, LLC

(57) ABSTRACT

A display input apparatus includes a display device, an operation device, and a control device. When, with a first page containing an arrangement of icons being displayed on the display device, the control device detects through the operation device a predetermined first operation of selecting a plurality of icons from the arrangement of icons on the first page and grouping the plurality of selected icons, the control device generates a group icon into which the plurality of icons are consolidated and allows the display device to display the group icon on the first page. When the control device detects through the operation device a predetermined second operation of moving the group icon from the first page to a second page different from the first page, the control device allows the display device to move the group icon to the second page and display the group icon on the second page.

3 Claims, 16 Drawing Sheets

(51) Int. Cl.
*H04N 1/00* (2006.01)
*G06F 3/0486* (2013.01)

(58) Field of Classification Search
CPC .............. G06F 3/0488; G06F 3/04883; H04N 1/00392; H04N 2201/0082
See application file for complete search history.

(56) References Cited

U.S. PATENT DOCUMENTS

| | | | |
|---|---|---|---|
| 2013/0050119 A1* | 2/2013 | Nemoto | G06F 3/04883 345/173 |
| 2013/0154978 A1 | 6/2013 | Kim et al. | |
| 2013/0167090 A1* | 6/2013 | Tomizu | G06F 3/0482 715/835 |
| 2013/0249837 A1* | 9/2013 | Liu | G06F 3/04817 345/173 |
| 2014/0165006 A1* | 6/2014 | Chaudhri | G06F 3/0487 715/835 |
| 2016/0124632 A1* | 5/2016 | Kamei | G06F 3/04842 715/769 |
| 2016/0170600 A1* | 6/2016 | Horiike | G06F 3/0485 715/769 |
| 2016/0253059 A1* | 9/2016 | Choi | G06F 3/0488 715/776 |
| 2019/0012061 A1* | 1/2019 | Hiranuma | G06F 3/0481 |
| 2020/0233568 A1* | 7/2020 | Wang | G06F 3/04817 |
| 2020/0241732 A1* | 7/2020 | Lu | G06F 3/04886 |

\* cited by examiner

DISPLAY INPUT APPARATUS AND IMAGE FORMING APPARATUS CAPABLE OF MOVING PLURALITY OF ICONS FROM ONE PAGE TO ANOTHER ON DISPLAY DEVICE AND DISPLAYING MOVED ICONS THEREON

INCORPORATION BY REFERENCE

This application claims priority to Japanese Patent Application No. 2020-068502 filed on 6 Apr. 2020, and Japanese Patent Application No. 2021-031958 filed on 1 Mar. 2021, the entire contents of which are incorporated by reference herein.

BACKGROUND

The present disclosure relates to a display input apparatus in which an icon is displayed on a display device and to which an operation or gesture on the icon is input through an operation device and an image forming apparatus with the display input apparatus, and particularly relates to a technique for moving an icon from one page to another on the display device and displaying the moved icon on the other page.

A display input apparatus includes a display device and an operation device capable of being operated by a user (for example, a touch panel provided on the screen of the display device). When a touch gesture is made on an icon being displayed on the screen of the display device, the point where the touch gesture has been made is detected by the touch panel and the specified icon is identified based on the point where the touch gesture has been made.

There is known, as a general technique for a display input apparatus, a technique in which an edit mode is executed in response to a first touch (long touch) on an icon being displayed on one page of a home screen, a scroll to another page on the home screen is performed in response to a second touch, continuation of the first touch during the scroll to the other page brings about continued display of the touched icon, and movement of the icon's position to the other page is completed upon release of the first touch on the icon, thus enabling a convenient and intuitive operation of icon movement.

SUMMARY

A technique improved over the aforementioned technique is proposed as one aspect of the present disclosure.

A display input apparatus according to an aspect of the present disclosure includes a display device, an operation device, and a control device. The operation device is a device through which a user's operation is input. The control device includes a processor and functions as a controller through the processor executing a control program. When, with a first page containing an arrangement of icons being displayed on the display device, the controller detects through the operation device a predetermined first operation of selecting a plurality of icons from the arrangement of icons on the first page and grouping the plurality of selected icons, the controller generates a group icon into which the plurality of icons are consolidated and allows the display device to display the generated group icon on the first page. When the controller detects through the operation device a predetermined second operation of moving the group icon from the first page to a second page different from the first page, the controller allows the display device to move the group icon to the second page and display the group icon on the second page.

An image forming apparatus according to another aspect of the present disclosure includes the above-described display input apparatus and an image forming device. The image forming device is capable of forming an image on a recording paper sheet.

DETAILED DESCRIPTION

Figure 1:
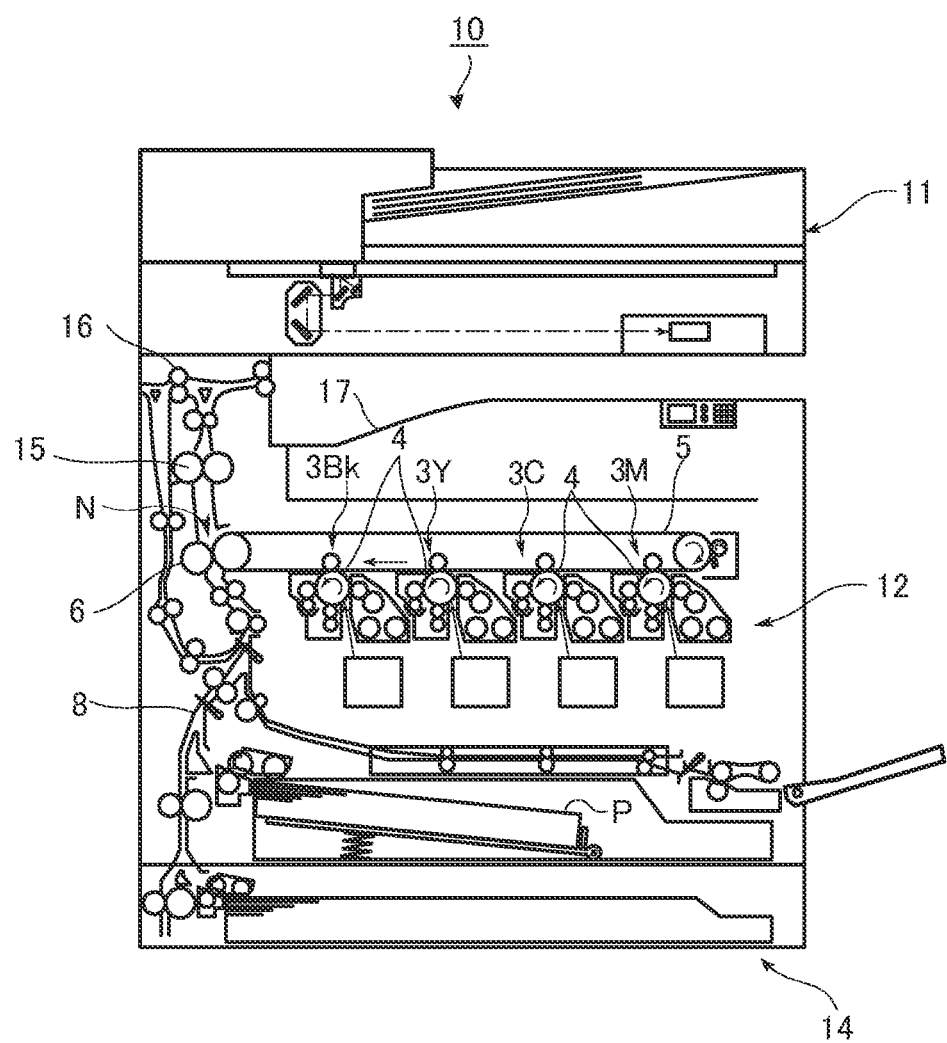
FIG. 1 is a cross-sectional view showing an image forming apparatus to which a display input apparatus according to one embodiment of the present disclosure is applied.

Hereinafter, a description will be given of a display input apparatus and an image forming apparatus both according to one embodiment of the present disclosure with reference to the drawings. FIG. 1 is a cross-sectional view showing an image forming apparatus to which a display input apparatus according to one embodiment of the present disclosure is applied. As shown in FIG. 1, an image forming apparatus 10 according to this embodiment is an MFP (multifunction peripheral) having multiple functions including, for example, a copy function, a print function, and a facsimile function. The image forming apparatus 10 includes an image reading device 11 and an image forming device 12.

The image reading device 11 includes an image pickup device capable of optically reading an image of an original document. The image reading device 11 converts an analog output of the image pickup device to a digital signal to generate image data representing the image of the original document.

The image forming device 12 is capable of forming the image of the original document on a recording paper sheet. The image forming device 12 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feed device 14 via a conveyance path 8.

Thereafter, heat and pressure are applied to the recording paper sheet P by a fixing device 15, so that the toner image on the recording paper sheet P is fixed by heat and pressure. Then, the recording paper sheet P is discharged through an ejection roller 16 to a sheet output tray 17.

Figure 2:
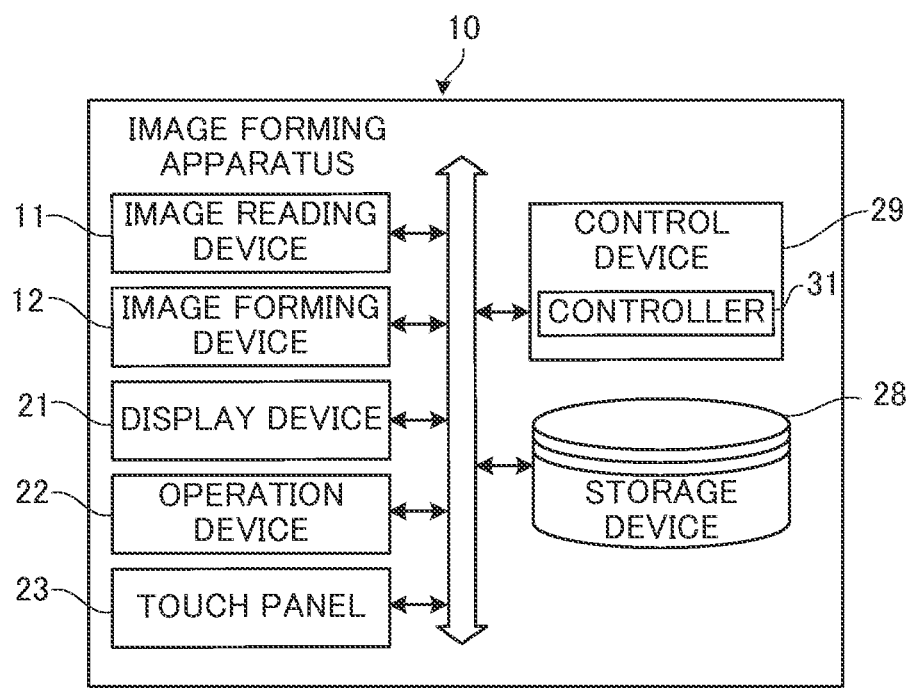
FIG. 2 is a block diagram showing an essential internal configuration of the image forming apparatus according to the embodiment.

FIG. 2 is a block diagram showing an essential internal configuration of the image forming apparatus 10 according to this embodiment. As shown in FIG. 2, the image forming apparatus 10 includes the image reading device 11, the image forming device 12, a display device 21, an operation device 22, a touch panel 23, a storage device 28, and a control device 29. These components are operable to transfer data or signals to and from each other via a bus.

The display device 21 is formed of a liquid crystal display (LCD), an organic EL (organic light-emitting diode (OLED)) display or the like. The operation device 22 includes a physical key, such as numeric keys, an Enter key or a Start key.

The touch panel 23 is provided over the screen of the display device 21. The touch panel 23 is a touch panel of a resistive film system, a capacitance system or any other system. The touch panel 23 detects a touch on the touch panel 23 with a user's finger or the like, together with a point of the touch, and outputs a detection signal indicating the coordinate of the point of touch to a below-described controller 31 of the control device 29 and so on. The touch panel 23 serves as an operation device through which a user's operation (gesture) made on the screen of the display device 21 is input.

The storage device 28 is a large storage device, such as an SSD (solid state drive) or an HDD (hard disk drive). The storage device 28 holds various types of application programs and various types of data.

The control device 29 is made up of a processor, a RAM (random access memory), a ROM (read only memory), and so on. The processor is a CPU (central processing unit), an ASIC (application specific integrated circuit), an MPU (micro processing unit) or the like. When a control program stored in the above ROM or the storage device 28 is executed by the above processor, the control device 29 functions as the controller 31.

The controller 31 performs the overall control of the image forming apparatus 10. The control device 29 is connected to the image reading device 11, the image reading device 12, the display device 21, the operation device 22, the touch panel 23, the storage device 28, and so on. The controller 31 performs the operation control of these components and signal or data transfer to and from each of these components.

The controller 31 serves as a processor that executes various types of processing necessary for image formation by the image forming apparatus 10. The controller 31 accepts, based on the detection signal output from the touch panel 23 or an operation made on a physical key of the operation device 22, an operating instruction input by the user. The controller 31 has the function of controlling the display operation of the display device 21.

In the image forming apparatus 10 having the above configuration, the user selects a copy function by operating the operation device 22 or the touch panel 23. Thus, an instruction to execute a copy is input to the operation device 22 or the touch panel 23. In response to the instruction to execute a copy, the controller 31 allows the image reading device 11 to read an image of an original document and allows the image forming device 12 to record the image of the original document on a recording paper sheet P.

Figure 3A:
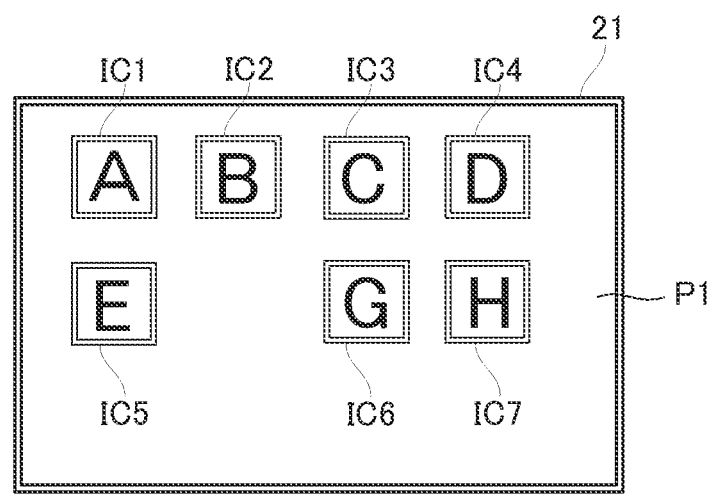
FIG. 3A is a view showing an example of a page displayed on a display device.
Figure 3B:
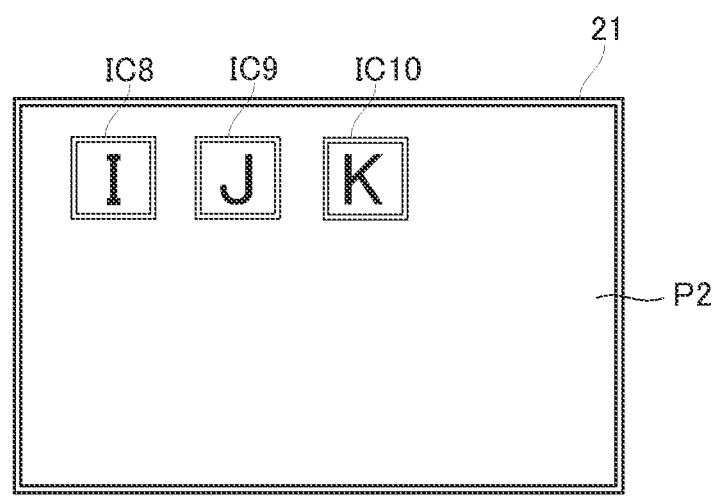
FIG. 3B is a view showing an example of another page displayed on the display device.
Figure 3C:
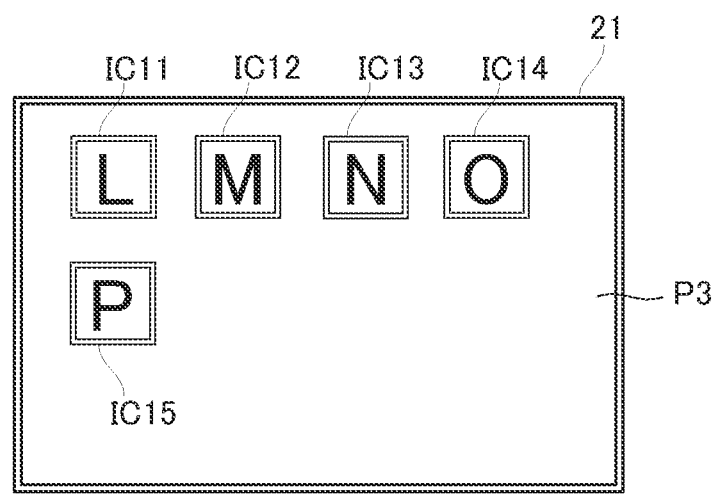
FIG. 3C is a view showing an example of still another page displayed on the display device.

Furthermore, the image forming apparatus 10 executes, with its increasing range of functions, a plurality of functions in a selective manner. In order to run each function, the controller 31 allows the display device 21 to switch among a plurality pages (such as pages of a home menu screen) in each of which icons associated with respective functions are arranged. Upon detection of a touch gesture on any one of the icons through the touch panel 23, the controller 31 executes the function associated with the icon. For example, the controller 31 allows the display device 21 to switch among a plurality of pages P1, P2, and P3 as shown in FIGS. 3A to 3C. On each of the pages P1, P2, and P3, an arrangement of icons, such as an icon IC1 and an icon IC2, are displayed. When a touch gesture is made on any one of the icons by the user, the controller 31 detects the touch gesture on the icon through the touch panel 23 and executes the function associated with the icon.

The user may have a desire to change icons to be displayed on each page. In this case, when the user makes, on an icon, a drag gesture of moving the icon from a page on which the icon is currently displayed to another page, the controller 31 detects the drag gesture on the icon through the touch panel 23 and performs, as control corresponding to the drag gesture, control to move the icon from the page on which the icon is currently displayed on the screen of the display device 21 to the other page and display the icon on the other page. In the other words, the control unit 31 performs, as control corresponding to the drag gesture, control to stop the display of the icon on the page on which the icon has been displayed so far, and to display the icon on the other page. However, it is troublesome to make a drag gesture on each of a plurality of icons in order to move the plurality of icons from one page to another.

To cope with this, in this embodiment, the touch panel 23 accepts, in response to a gesture made on the screen of the display device 21 by the user, an input of an instruction to select a plurality of icons being displayed on one page. Subsequently, when the controller 31 detects through the touch panel 23 a grouping instruction to group the plurality of selected icons, the controller 31 generates, according to the grouping instruction, a group icon into which the plurality of selected icons are consolidated (and which resembles a folder in which the plurality of icons are contained).

Then, when the user makes, on the group icon, a drag gesture of moving the group icon from the page where the group icon is displayed to another page, the controller 31 detects through the touch panel 23 the drag gesture on the icon as an instruction to move the group icon from the page on which the group icon is displayed to the other page and display the group icon on the other page, and performs, as control corresponding to this instruction, control to move the group icon from the page on which the group icon is displayed to the other page and display the group icon on the other page. Furthermore, when the user makes, on the screen of the display device 21, a gesture of giving an instruction to expand the group icon, the controller 31 detects the gesture as an instruction to expand the group icon, expands the group icon according to the instruction, and allows icons having been consolidated into the group icon to be separately displayed in an unconsolidated state on another page. Accordingly, a user's operation in collectively moving a plurality of icons to another page is simplified.

Next, a detailed description will be given of a control procedure for collectively moving a plurality of icons from one page to another and displaying the icons on the other page with reference to flowcharts shown in FIGS. 4A and 4B and so on.

Figure 5A:
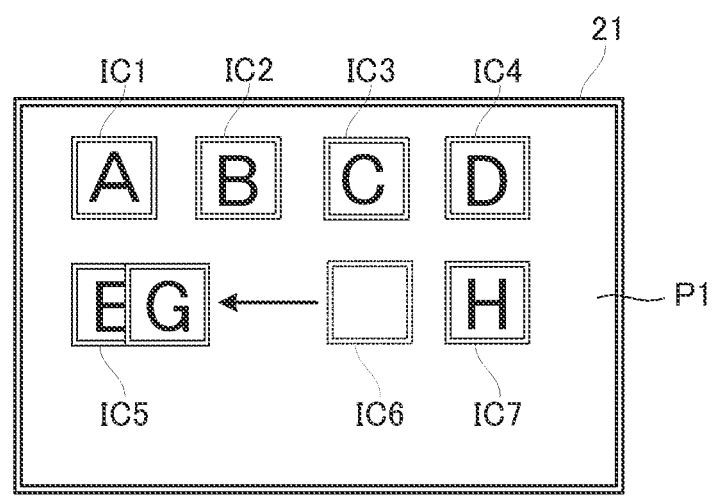
FIGS. 5A to 5C are views showing a process of operation for consolidating a plurality of icons into a single group icon on a screen of the display device.
Figure 5B:
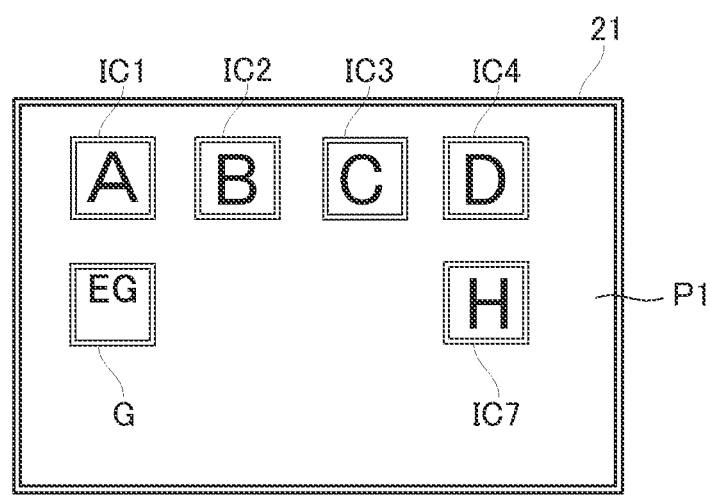

Suppose that, as shown in FIG. 5A, the controller 31 allows the display device 21 to display on the screen of the display device 21 a page P1 where icons IC1 to IC7 are arranged (step S101). After the processing in step S101, the controller 31 waits until it accepts a drag-and-drop gesture on an icon ("NO" in step S102). When the user makes, for example, on the icon IC6, a drag-and-drop gesture of moving the icon IC6 to another icon IC5, the controller 31 detects the drag-and-drop gesture through the touch panel 23 ("YES" in step S102), allows the display device 21 to move the icon IC6 until it overlaps with the other icon IC5 according to the drag-and-drop gesture, allows the display device 21 to display the icon IC6 being overlapped with the icon IC5, then generates, as shown in FIG. 5B, a group icon G formed by grouping the icon IC5 and the icon IC6, and allows the display device 21 to display the group icon G on the page P1 (step S103).

Alternatively, when a drag-and-drop gesture on an icon is made to move the icon to an empty space within the page and the drag-and-drop gesture is detected through the touch panel 23 by the controller 31, the controller 31 allows the display device 21 to simply move the icon to the empty space and display the icon in the empty space, and does not generate a group icon. Furthermore, when detecting a touch gesture on the icon through the touch panel 23, the controller 31 executes a function associated with the icon.

Figure 5C:
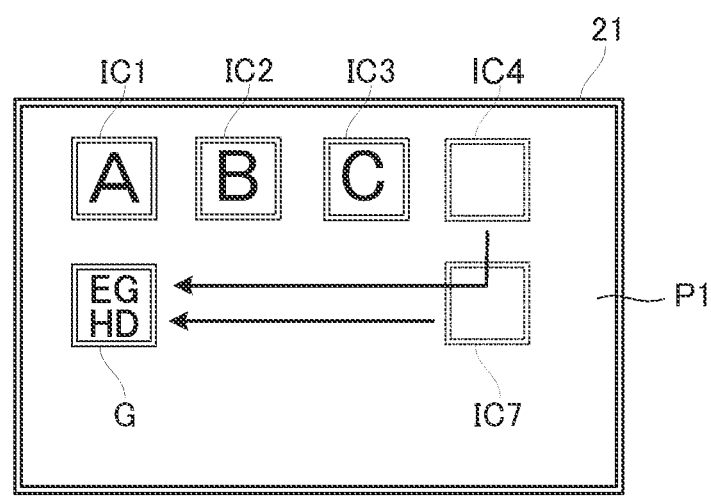

Suppose that, subsequently, the user makes a drag-and-drop gesture on another icon to move the icon to the group icon G or make a drag gesture on the group icon G. For example, when the user makes a drag-and-drop gesture on another icon IC7 to move the icon IC7 to the group icon G and the controller 31 detects the drag-and-drop gesture through the touch panel 23 ("YES" in step S104), the controller 31 updates the group icon G by further adding the other icon IC7 to the group consisting of the icons IC5 and IC6 and allows the display device 21 to display the updated group icon G on the page P1 (step S105). Hereafter likewise, each time the controller 31 detects through the touch panel 23 a drag-and-drop gesture on another icon (for example, the icon IC4) to move the icon to the group icon G, the controller 31 updates the group icon G by adding the other icon to the group forming the group icon G. For example, as shown in FIG. 5C, the controller 31 generates a group consisting of the icons IC4, IC5, IC6, and IC7 and allows the display device 21 to display the group icon G representing this group on the page P1. Furthermore, when detecting a drag-and-drop gesture of overlapping different icons with each other, the controller 31 generates a group icon G formed by a group consisting of the different icons and allows the display device 21 to display the group icon G on the page P1.

Figure 6A:
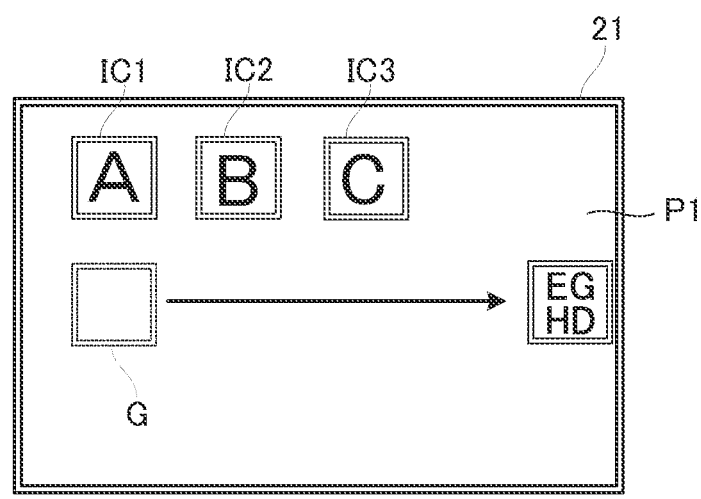
FIGS. 6A and 6B are views showing a process of operation for moving the group icon from one page to another on the screen of the display device.

Then, when the user makes a drag gesture on the group icon G (an operation of making a touch gesture on the group icon G and moving the point of the touch gesture) and the controller 31 detects the drag gesture on the group icon G through the touch panel 23 ("NO" in step S104 and "YES" in step S106), the controller 31 allows the display device 21 to move and display the group icon G within the page P1 so that the group icon G follows the drag gesture, as shown in FIG. 6A (step S107). In this course, when detecting through the touch panel 23 that the user's drag gesture on the group icon G has been made to the right end of the screen of the display device 21 (a point thereof across pages) ("YES" in step S108), the controller 31 allows the display device 21 to display the next page P2 on the screen, move the group icon G to the next page P2, and display it on the next page P2 as shown as an example in FIG. 6B (step S109). If NO in step S106, the processing goes back to step S104.

Alternatively, when detecting through the touch panel 23 that the user's drag gesture on the group icon G has been made to the left end of the screen of the display device 21 (a point thereof across pages) ("YES" in step S108), the controller 31 allows the display device 21 to display the previous page on the screen, move the group icon G to the previous page, and display it on the previous page (step S109). If NO in step S108, the controller 31 allows the display device 21 to move, within the screen of the display device 21, the group icon G to a point where the user's drag gesture on the group icon G has been terminated and display the group icon G on the point, and then the processing goes to step S110.

Hereafter likewise, when detecting through the touch panel 23 that the user's drag gesture on the group icon G has been made to the right or left end of the screen of the display device 21, the controller 31 allows the display device 21 to display the second next or previous page on the screen, move the group icon G to the displayed next or previous page, and display it on this page.

In this manner, the user can move the group icon G across pages to a desired page and place it on the desired page by a drag gesture and a subsequent drop gesture (a drag-and-drop gesture) on the group icon G.

Figure 7A:
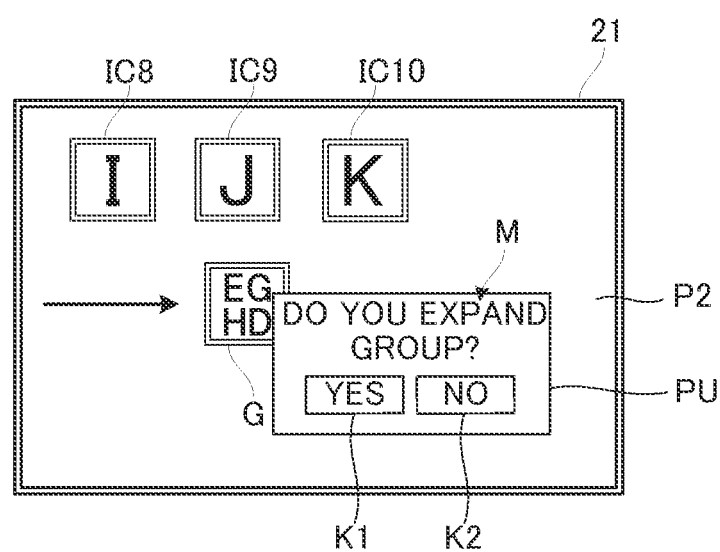
FIGS. 7A and 7B are views showing a process of operation for expanding the group icon to display the plurality of icons.

Then, when, after the user moves the group icon G to the desired page by a drag gesture or while the group icon G is displayed on the original page, the user makes a touch gesture on the group icon G and the controller 31 detects through the touch panel 23 the touch gesture on the group icon G ("YES" in step S110), the controller 31 allows the display device 21 to display a pop-up PU on the screen of the display device 21 as shown in FIG. 7A (step S112). The controller 31 allows the pop-up PU to show a massage M prompting to expand the group icon G, a key K1 representing "YES", and a key K2 representing "NO". If NO in step S110, the processing goes back to step S107.

Figure 4A:
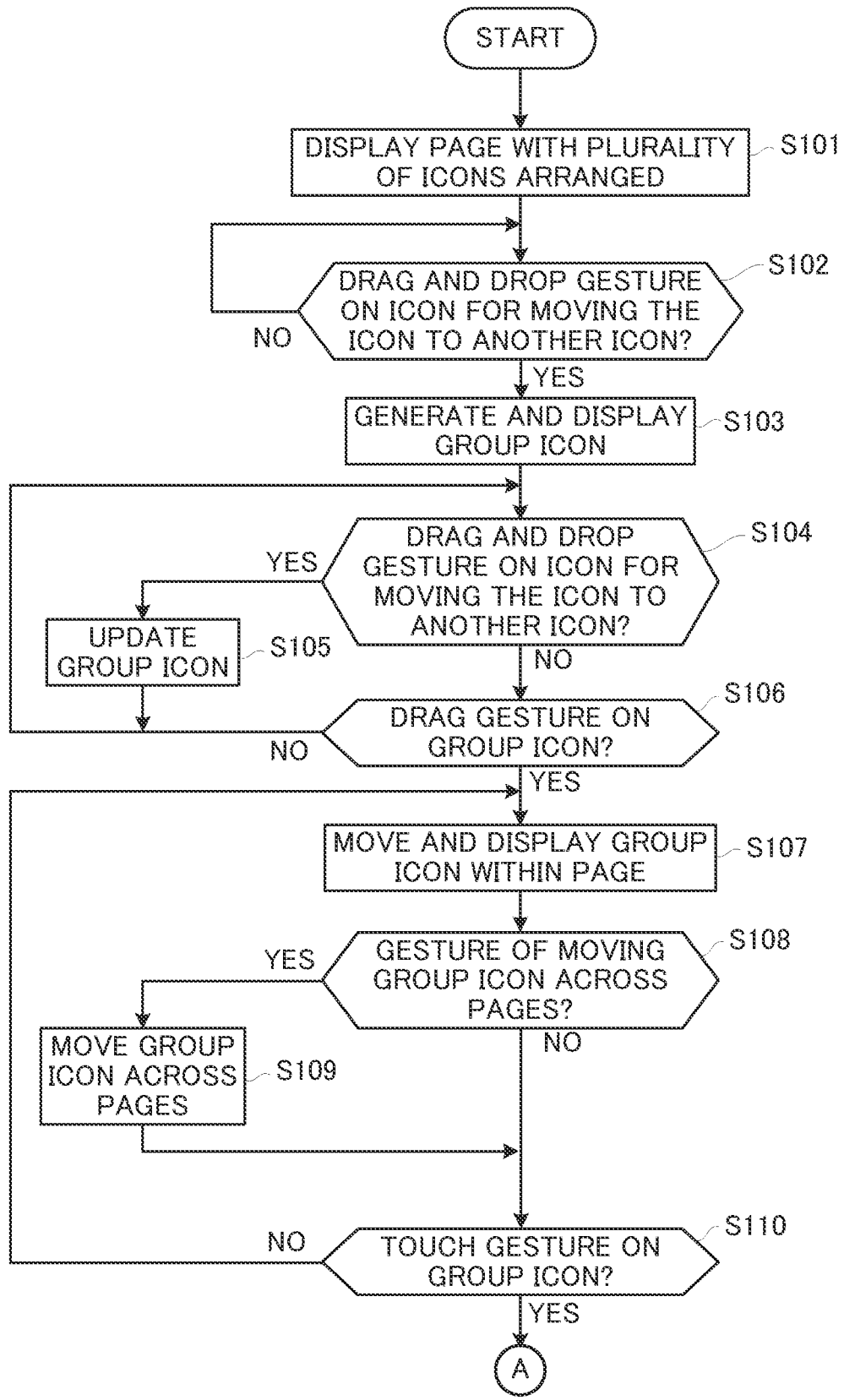
FIG. 4A is a flowchart showing a control procedure for collectively moving a plurality of icons from one page to another.
Figure 4B:
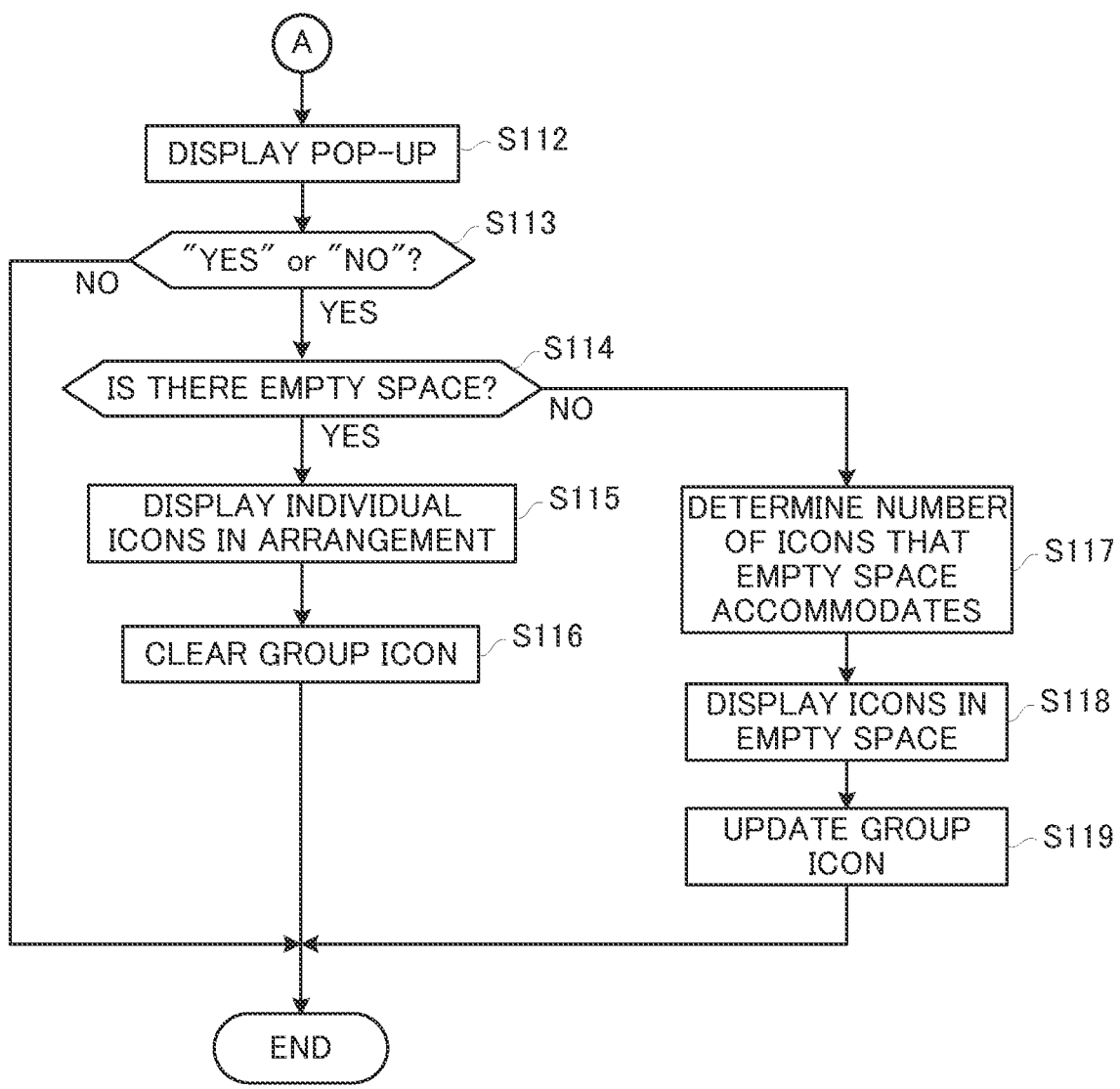
FIG. 4B is a flowchart showing a control procedure following the control procedure in FIG. 4A.
Figure 6B:
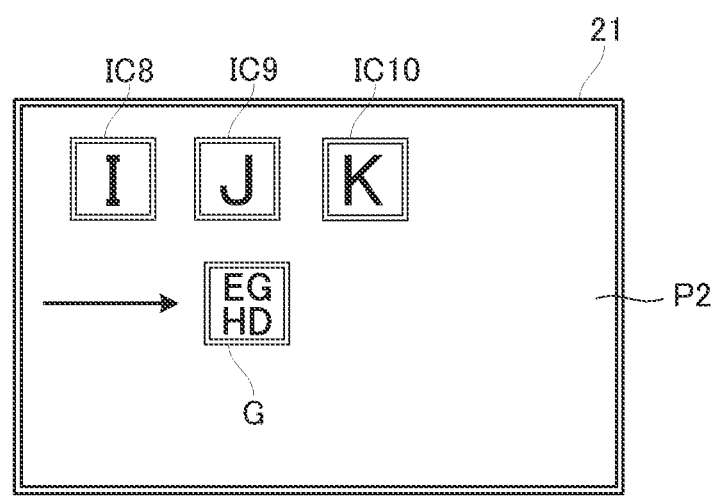

For example, when the user views the message M and makes a touch gesture on the key K2 representing "NO", the controller 31 detects through the touch panel 23 the touch gesture on the key K2 representing "NO" ("NO" in step S113) and terminates the control shown in FIGS. 4A and 4B while maintaining the display and position of the group icon G on the page P2 as shown in FIG. 6B.

On the other hand, when the user makes a touch gesture on the key K1 representing "YES" and the controller 31 detects through the touch panel 23 the touch gesture on the key K1 representing "YES" ("YES" in step S113), the controller 31 determines whether or not there is empty space required, on the page being displayed on the display device 21, to expand the group icon G into individual icons and display the icons separately in an arrangement (step S114).

Figure 7B:
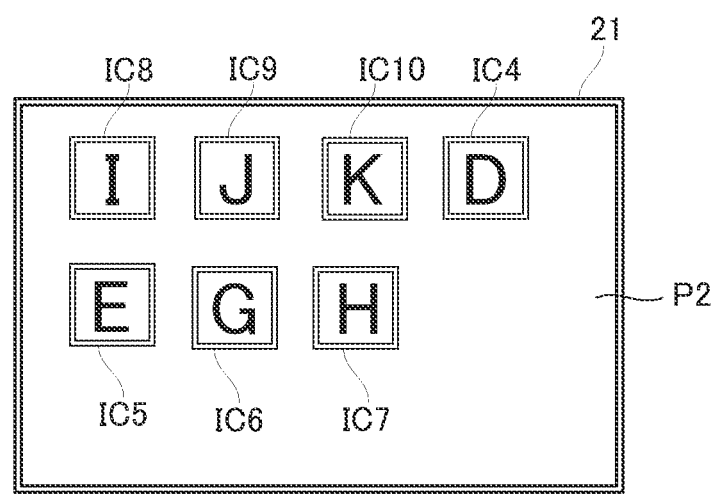

When determining that there is the required empty space on the page being displayed on the display device 21 ("YES"

in step S114), the controller 31 expands the group icon G and allows the display device 21 to display the icons of the group icon G separately in an arrangement on the page P2 as shown in FIG. 7B (step S115) and clear the group icon G from the screen of the display device 21 (step S116). Then, the controller 31 terminates the control shown in FIGS. 4A and 4B.

Figure 8A:
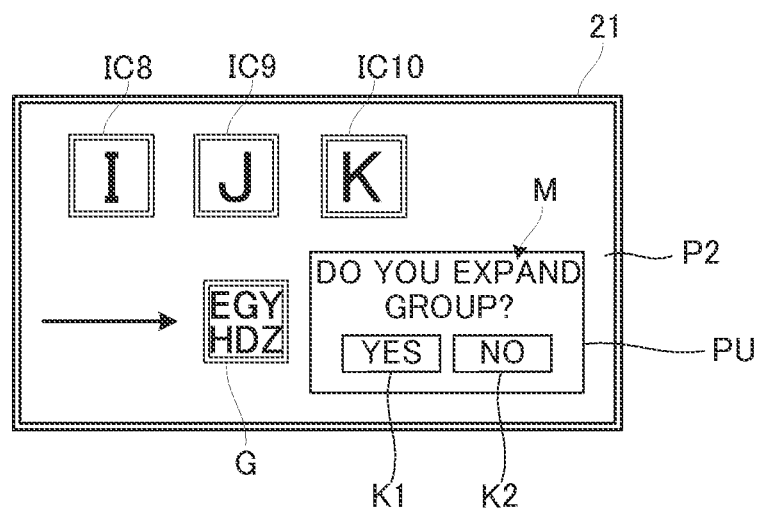
FIGS. 8A and 8B are views showing another example of a process of operation for expanding a group icon to display a plurality of icons.
Figure 8B:
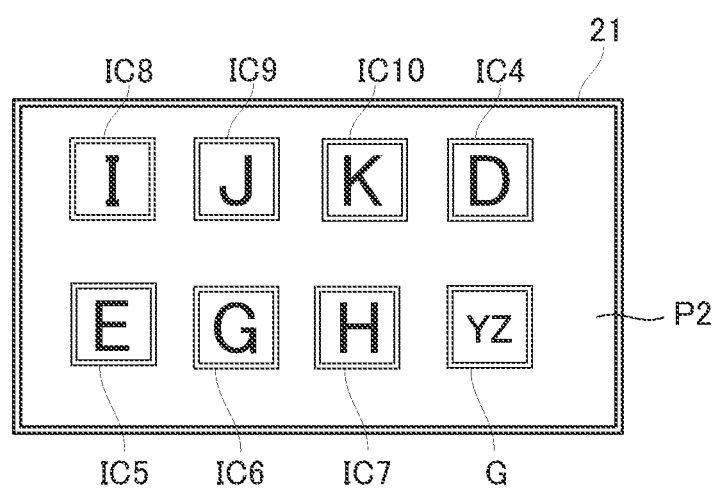

On the other hand, when determining that there is no required empty space on the page being displayed on the display device 21 ("NO" in step S114), the controller 31 determines the number of icons displayable in an arrangement within an empty space on the page being displayed on the display device 21 (step S117), selects a number of icons satisfying a predetermined condition in a range not greater than the determined number from among the icons constituting the group icon G, allows the display device 21 to display only the selected icons separately in an arrangement in the empty space as shown in, for example, FIG. 8B (step S118), and updates the group icon G shown in FIG. 8A to a group icon where only unselected icons are consolidated (step S119). Then, the controller 31 terminates the control shown in FIGS. 4A and 4B.

An example of the predetermined condition is respective priorities of individual icons. The controller 31 previously generates a table in which the priorities are registered, allows the storage device 28 to store the table, and sequentially selects icons from among the icons constituting the group icon G according to their priorities with reference to the table.

Another example of the predetermined condition is a specific function of each individual icon. The controller 31 previously generates a table in which respective specific functions of the icons are registered, allows the storage device 28 to store the table, and selects icons associated with the specific function from among the icons constituting the group icon G with reference to the table. In addition or alternatively to this, the controller 31 (i) may select, from among the icons constituting the group icon G, icons other than the icons associated with the specific function or (ii) may select, between the icons associated with the specific function and the other icons, those greater in number or those smaller in number under an additional condition that the number is not greater than the determined number.

Still another example of the predetermined condition is a vendor of the function (an application program) of each icon. The controller 31 previously generates a table in which respective vendors of the icons are registered, allows the storage device 28 to store the table, and selects icons associated with the specific vendor from among the icons constituting the group icon G with reference to the table. In addition or alternatively to this, the controller 31 (iii) may select, from among the icons constituting the group icon G, icons other than the icons associated with the specific vendor or (iv) may select, between the icons associated with the specific vendor and the other icons, those greater in number or those smaller in number under an additional condition that the number is not greater than the determined number.

If the number of icons displayable in an arrangement within the empty space is zero, the controller 31 performs neither expansion nor update of the group icon G and terminates the control shown in FIGS. 4A and 4B while maintaining the display and position of the group icon G on the page P2 as shown in FIG. 6B.

In the general technique described previously, the user can move an icon from one page to another by simultaneously making a first touch on the icon and a second touch giving an instruction to scroll the pages. However, in moving a plurality of icons from one page to another, it is necessary to make the first touch and the second touch on each icon and repeat them, which is a troublesome operation.

Unlike the above, in this embodiment, a group icon representing a group in which a plurality of icons are consolidated is generated, the display device 21 is allowed to move the group icon from one page to another and display the moved group icon on the other page, the group icon is expanded into individual icons, and the icons obtained by the expansion are separately displayed. Therefore, the user's operation in moving a plurality of icons from one page to another and displaying them on the other page is simplified. Thus, with a simple operation, the display device 21 can be allowed to move a plurality of icons from one page to another on the display device 21 and display them on the other page.

In the above embodiment, the controller 31 allows the group icon G to be moved from one page to another and displayed on the other page and, upon subsequent detection of a predetermined user's gesture, expands the group icon G. Alternatively to this, upon movement of the group icon G from one page to another and display of the group icon G on the other page, the controller 31 may immediately expand the group icon G regardless of whether a user's gesture has been made or not, and display the icons separately on the other page.

Furthermore, the controller 31 may allow the display device 21 to move the group icon G from one page to another and display it on the other page in response to an operation different from a drag-and-drop gesture.

Although the above embodiment illustrates an image forming apparatus to which a display input apparatus according to one embodiment of the present disclosure is applied, a display input apparatus according to the present disclosure can be applied to other types of electronic equipment, including a personal computer, a mobile device, and a mobile phone.

The structure, configuration, and processing of the above embodiment described with reference to FIGS. 1 to 7B are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A display input apparatus comprising:
    a display device;
    an operation device through which a user's operation is input; and
    a control device including a processor and functioning as a controller through the processor executing a control program, wherein
    when, with a first page containing an arrangement of icons being displayed on the display device, the controller detects through the operation device a predetermined first operation of selecting a plurality of icons from the arrangement of icons on the first page and grouping the plurality of icons, the controller generates a first group icon into which the plurality of icons are consolidated and allows the display device to display the first group icon on the first page, and
    when the controller detects through the operation device a predetermined second operation of moving the first group icon from the first page to a second page different from the first page, the controller allows the display device to move the first group icon to the second page and display the first group icon on the second page, wherein the controller allows the display device, when there is an empty space required to display all of the plurality of icons on the second page, to display all of the plurality of icons on the second page and remove the first group icon from the second page, and the controller selects, when there is no the required empty space on the second page, icons for performing respective functions of a predetermined vendor, from among the plurality of icons, in a range not greater than the number of icons displayable in an actual empty space on the second page, allows the display device to display the selected icons in the actual empty space, and display, instead of the first group icon, a second group icon into which unselected icons among the plurality of icons are consolidated.

2. The display input apparatus according to claim 1, wherein the controller limits a number of icons to be displayed on the second page in accordance with a size of the actual empty space on the second page.

3. An image forming apparatus comprising:
the display input apparatus according to claim 1; and
an image forming device capable of forming an image on a recording paper sheet.

* * * * *